United States Patent [19]

Keller

[11] 3,888,668

[45] June 10, 1975

[54] IMAGING MEDIUM COMPRISING PHOTOCONDUCTOR OF TiO$_2$ AND SENSITIZING DYE

[75] Inventor: Juergen H. H. Keller, Chelmsford, Mass.

[73] Assignee: Itek Corp., Lexington, Mass.

[22] Filed: Oct. 2, 1972

[21] Appl. No.: 293,908

Related U.S. Application Data

[62] Division of Ser. No. 796,167, Feb. 3, 1969, Pat. No. 3,574,612.

[52] U.S. Cl. .................. 96/1.6; 96/1 R; 96/48 PD
[51] Int. Cl. ............................................. G03g 5/00
[58] Field of Search ......... 96/48 R, 48 PD, 1.5, 1.7, 96/1.6; 260/240.4

[56] References Cited

UNITED STATES PATENTS

| | | | |
|---|---|---|---|
| 2,280,253 | 4/1942 | Muller et al. | 260/240.9 |
| 2,313,922 | 3/1943 | Carroll et al. | 260/240.9 |
| 3,121,006 | 2/1964 | Middleton et al. | 96/1.5 |
| 3,125,447 | 3/1964 | Stewart | 96/1.7 |
| 3,128,179 | 4/1964 | Kendall et al. | 96/1.7 |
| 3,382,076 | 5/1968 | Kalenda | 96/129 |
| 3,666,464 | 5/1972 | Keller et al. | 96/48 PD |

OTHER PUBLICATIONS

Hamer, The Cyanine Dyes and Related Compounds, pp. 410–415, Interscience Publishers (1964).

*Primary Examiner*—Norman G. Torchin
*Assistant Examiner*—Edward C. Kimlin
*Attorney, Agent, or Firm*—Homer O. Blair; Robert L. Nathans; W. Gary Goodson

[57] ABSTRACT

This invention relates to an improved process for the preparation of organic dyestuffs and especially styryl dyes which are particularly useful in improving the photographic exposure speed of reproduction systems. The process involves the condensation of a color former with a Schiff's base, the color former and Schiff's base being selected to provide the desired dyestuff. For the styryl dyes, the color former is a heterocyclic aromatic compound and the Schiff's base is of an amino-substituted aromatic aldehyde. The heterocyclic compound contains at least one quaternary nitrogen hetero atom and at least one methyl group as a ring substituent. The present process provides a more efficient and practical method of producing the styryl dyes than the prior art method in which the aldehyde corresponding to the Schiff's base is utilized as condensing agent, the resulting overall yields being substantially higher.

9 Claims, No Drawings

IMAGING MEDIUM COMPRISING PHOTOCONDUCTOR OF TiO₂ AND SENSITIZING DYE

This is a division, of application Ser. No. 796,167, filed Feb. 3, 1969 now U.S. Pat. 3,574,612.

This invention also relates to a new series of compounds which are characterized by having at least one hydroxyalkyl substituent on the amino substituent of the styryl dye. These compounds give greater photographic exposure speed than otherwise equivalent styryl dyes which lack a hydroxyalkyl group on the amino substituent.

BACKGROUND OF THE INVENTION

1. Field of the Invention

This invention relates to the process of preparing organic dyes and particularly styryl dyes, as well as new styryl dyes which are especially effective in sensitizing photographic media to visible light.

2. Description of the Prior Art

The condensation of an aldehyde with a color former to produce organic dyes is a well-known reaction, usually involving carbonyl condensation with an active methylene group of the color former to yield an ethylenic linkage.

The hemicyanine dyes are well-known compounds which are characterized by at least two amino nitrogen atoms connected by a chain of conjugated double bonds, with one of the nitrogen atoms being part of a heterocyclic nucleus, the other being an amino substituent on a benzenoid nucleus, the latter being connected to the heterocyclic nucleus by an unsaturated chain of carbon atoms, the double bonds of which are conjugated with the said nuclei. The simplest of these compounds are those in which the unsaturated chain is an ethylene group, i.e. the styryl dyes.

The styryl dyes are well-known and have been described in innumerable literature articles and standard texts (vide: *Cyanine Dyes and Related Compounds*, Hamer (1964) Interscience Publishers, John Wiley & Sons, New York, N.Y.).

The usual method of preparing the said dyes is by condensation of an amino-substituted benzaldehyde with a heterocyclic compound containing at least one quaternary nitrogen hetero atom and an active methyl substituent. For example, p-dimethylaminobenzaldehyde condenses with -picoline methiodide to form the corresponding styryl dye. The condensation reaction is catalysed by the presence of an amine, usually piperidine.

The usual method of preparation of the p-aminobenzaldehyde intermediate involves condensation of a p-nitrosoaniline with an aniline compound to form the corresponding Schiff's base, in the presence of formaldehyde, followed by hydrolysis to the corresponding aminobenzaldehyde. The hydrolysis reaction is not always efficient as far as yields of the desired end-product is concerned.

A particularly effective group of hemicyanine dyes and the method of use as photographic sensitizers is described in a commonly assigned, copending U.S. Pat. No. 3,666,464 which is incorporated herein by reference.

SUMMARY OF THE INVENTION

It has now been discovered that the process of preparing organic dyes, especially styryl dyes, is substantially improved by substitution of a Schiff's base for the aldehyde employed in the condensation with the active methyl group, as hereinbefore described. It is indeed surprising that the Schiff's base will function in the said condensation reaction and, as a result, substantially improved overall yields of the final styryl product are obtained. For example, in the preparation of the N-hydroxyalkyl substituted styryl dyes, as described herein, the overall yields of products are improved up to four-fold and sometimes higher, when compared to the aforesaid method of preparation based on use of the corresponding aldehyde.

It is thought that the free aldehyde grouping undergoes competing reactions and thus leads to reduced overall yields. The corresponding Schiff's base, on the other hand, does not appear to react in these secondary or competing reactions or at least the extent to which such secondary reactions occur is minimized in comparison to the free aldehyde. Whatever the explanation, it remains that the use of the corresponding Schiff's base leads to substantial improvement in the said process.

The present method can also be employed and is especially effective in the preparation of a new class of styryl dyes which are particularly effective in improving the photographic speed of media described herein. The specific new styryl compounds are those in which at least one of $R_1$ and $R_2$ of the substituent, $-NR_1R_2$, is a hydroxyalkyl substituent. Especially preferred compounds are those in which both $R_1$ and $R_2$ are each hydroxyalkyl. Such hydroxyalkyl compounds give increased speeds in comparison with corresponding compounds in which $R_1$ and $R_2$ are other than hydroxyalkyl, the increase in speed amounting to an average of two to three fold, in general.

The new compounds which are useful in the same manner as the known styryl dyes are represented by the formula:

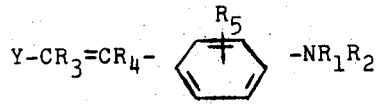

wherein Y is a radical of a heterocyclic aromatic compound containing at least one quaternary nitrogen hetero atom; $R_1$ is a hydroxyalkyl; $R_2$ is selected from the group consisting of hydrogen, alkyl, aryl, alkaryl, aralkyl and hydroxyalkyl; $R_3$ and $R_4$ are each selected from the group consisting of hydrogen and alkyl; and $R_5$ is selected from the group consisting of hydrogen, alkyl, aryl, aralkyl, alkaryl, alkoxy, and $NR_1R_2$ wherein $R_1$ and $R_2$ are each as described herein.

DESCRIPTION OF PREFERRED EMBODIMENTS

The preferred new compounds are those in which Y is one of the following formulae:

FORMULA I

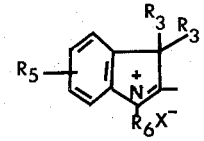

FORMULA II

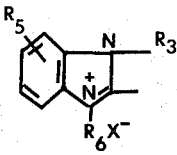

FORMULA III

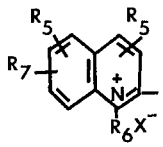

FORMULA IV

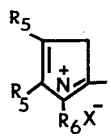

FORMULA V

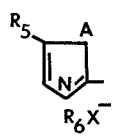

and

FORMULA VI

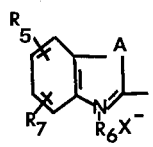

wherein A is oxygen, sulfur or selenium; $R_7$ is alkoxy or amino, especially diakylamino; $R_6$ is hydrogen, alkyl, aralkyl or hydroxyalkyl; $R_3$ and $R_5$ are as previously described; and X is a negative radical, such as halide radical, e.g. chloride, bromide, iodide or fluoride ion, derived from the quaternary ammonium salt former. Such negative radicals can include any of the negative ions of acids which form salts with the amino nitrogen of the heterocyclic ring; or alternatively from alkyl sulfates, nitrates or the like. The preferred $R_6$ substituent is hydroxyalkyl.

In the foregoing description of the new compounds of this invention, the various hydrocarbon substituents preferably contain not more than 8 carbon atoms and the alkyl substituents, including hydroxyalkyl, are lower alkyl, e.g. contain from 1 to about 5 atoms.

The concentration of the present new compounds in their use in photographic media as well as the details of their incorporation into the media is the same as with similar compounds of the prior art and the aforesaid copending U.S. Pat. No. 3,666,464 provides full details thereof.

The present new compounds are prepared by the present new and improved process using the Schiff's base or by the art-recognized processes, e.g. by condensing the corresponding aldehyde with a suitable heterocyclic compound, as described, with the overall yields of the latter process being substantially lower. AS is quite apparent, the synthesis of the said aldehyde involves theh production of a Schiff's base which is then converted to the free aldehyde. Thus the use of the Schiff's base obviates the step of conversion to the free aldehyde, thus leading to a more efficient process and higher overall yields since the said conversion usually leads to low yields of the aldehyde. However, it is further apparent from the results observed that the condensation of the Schiff's base with the selected heterocyclic compound is more efficient than the same condensation of the free aldehyde. In the condensation with free aldehyde, there appears to be substantial competing reactions which lead to mixtures of products, with the desired product not always being the major constituent. Due to such mixtures, the desired product is only obtainable by expensive and time-consuming separation procedures, e.g. chromatography and selective crystallization solvents. When the Schiff's base is used, such problems are usually avoided, or at least minimized since simple recovery techniques seem to be sufficient to obtain the end product, i.e. if the product obtained is a mixture, the desired end product is the major constituent and readily recoverable.

The present new process is particularly effective in the preparation of the present new compounds containing a hydroxyalkyl substituted amino group, where the best improvement in yields is realized.

In the present new process, the preferred Schiff's base is of the formula:

$$R_9R_8 NC_6H_4N=CHC_6H_4NR_8R_9$$

in which each $R_8$ and $R_9$ are each hydrogen, alkyl, aryl, aralkyl, alkaryl and especially hydroxyalkyl, particularly in which the alkyl moiety is lower alkyl. The preferred heterocyclic aromatic compounds are those containing at least one nitrogen hetero atom and at least one methyl group as a ring substituent. Such heterocyclic compounds may also contain additional inert substituents, i.e. those which do not adversely affect the condensation reaction, e.g. hydrocarbon substituents such as alkyl, aryl, aralkyl, alkaryl, cycloalkyl, alkenyl and the like, which may be substituted by such groups as hydroxy, amino, halo, alkoxy and the like; and substituents such as halogen, hydroxy, cyano, alkoxy, amino, etc. The heterocyclic ring can also be a condensed ring system, i.e. condensed with benzene or naphthalene ring systems.

The preferred color formers are heterocyclic ring systems such as thiazole, quinoline, thiadiazole, benzimidazole, benzothiazole and indole ring systems. For reaction to produce an ethylenic group, the color former must have an active methylene group which, in simplest form, is an active methyl group. The color formers are known in the art and usually, for simplicity, are methyl-substituted heterocyclic compounds, as depicted, for example, in formula I–VI. The following examples further illustrate the herein described invention.

EXAMPLE 1

A. Preparation of Schiff's base:

A mixture of bis ($\beta$-hydroxyethyl) aniline (72.4g.), 40 ml. of water and 80 ml. of conc. HCl is stirred in a flask and cooled to 5°C. A solution of 29.2g. NaNO$_2$ in 50 ml. H$_2$O is added over a period of 40 minutes while the temperature is maintained at 5°C. The mixture is then filtered and the solid washed with 80 ml. of dilute HCl to obtain 92g. of wet orange material which is added to a solution, prepared by heating on a steam bath.

| 86.3g. | bis (β-hydroxyethyl) aniline |
| 96 | ml conc. HCl |
| 50 | ml 37% aqueous formaldehyde |

The reaction mixture is allowed to stand for 1 hour and 800 g. of crushed ice is added and followed by neutralizing with 40% NaOH solution. A plastic mass forms and is separated and washed several times with cold water. The mass is crystallized from ethanol to obtain 67 g. of product, m. 177°–178°C., N-[p-bis(hydroxyethyl)aminobenzylidine] p-[bis(hydroxyethyl)amino] aniline.

B. Preparation of aldehyde:

A mixture of 54 g. of the Schiff's base thus obtained, 84 ml. acetic acid and 40 ml. of 37% aqueous formaldehyde is stirred at room temperature for 4 hours. The mixture is then cooled, diluted with 140 ml. of ice water, then made alkaline with ammonium hydroxide and extracted with 10 portions of boiling chloroform (3000 ml. total volume). The combined chloroform extracts are dried over anhydrous magnesium sulfate and then evaporated to obtain 25 g. of sticky yellow product.

C. 4-Phenyl-2[p-bis(β-hydroxyethyl)aminostyryl] thiazole-3-β-hydroxyethobromide.

2-Methyl-4-phenylthiazole (9g.) and bromoethanol (7g.) are heated for 4 hours at 115°C., cooled, slurred with ether, filtered, washed with ether and dried to obtain 3g. of the hydroxyethobromide.

The hydroxyethobromide salt (3g.) and the Schiff's base of paragraph A (4g.) are refluxed in 40 ml. ethanol containing piperidine (1g.) for 15 minutes. After cooling acetone and ether is added to precipitate a sticky product, 6.5 g. of crude product which is then stirred successively with 5 portions of acetone to obrain 4.3g. of product. Recrystallization from hot methanol by addition of acetone (2 times) gives the product, m. 187-188°C. (D-max. 0.9 at 492 millimicrons-1/110,000 methanol).

This product is converted to the chloride by dissolving in boiling water (1.2g/200 ml.) and adding 30g. NaCl. The mixture is cooled and filtered to obtain 1.0g. of the chloride. Recrystallization from ethanol gives a product which melts at 217°–218°C., D.max. 0.98 at 492 millimicrons (1/110,000 methanol).

EXAMPLE 2

The procedure of paragraph C of Example 1 is repeated using the following heterocyclic compounds to obtain the corresponding dye:

| Heterocyclic Compound | Absorption Peak of Resulting Dye (in millimicrons) |
| --- | --- |
| lepidine hydroxyethobromide | 548 |
| quinaldine metho-methylsulfate | 526 |
| 6-dimethylaminoquinaldine hydroxyethobromide | 535 |
| 2-methyl-β-naphthothiazole etho-p-toluenesulfonate | 528 |
| 2-methylbenzothiazole etho-p-toluenesulfonate | 526 |
| 2,3,3-trimethylindolenine ethiodide | 548 |
| 2,5,6-trimethylbenzoxazole methosulfate | 488 |
| 2-methyl-4-phenylthiazole methiodide | 488 |
| 2,4-dimethylthiazole decobromide | 484 |

EXAMPLE 3

2-[p-bis(β-Hydroxyethyl)aminostyryl]-5-methyl-1,3,4-thiadiazole-3-β-hydroxyethobromide 2,5-Dimethyl-1,3,4-thiadiazole (45g.) is heated to 110°C. and 52.5g. of bromoethanol added over a period of 35 minutes at 110°C. and heating is continued for 15 minutes at 110°C. After cooling, acetone is added and the product washed several times with acetone to obtain 50g. of the ethobromide salt.

The ethobromide salt (12g.), the Schiff's base from Example 1 (19.5g.) in 50 ml. of ethanol containing 4.4g. piperidine is heated to reflux temperature, then cooled and diluted with acetone. The precipitated product is filtered to obtain 16g. of purple crystals, after recrystallization from methanol, Dmax. 1.14, 498 millimicrons, 1/110,000 methanol.

EXAMPLE 4

4-methyl-2-[p-bis(hydroxyethyl)aminostyryl]thiazole-β-hydroxyethobromide

Schiff's Method:

2,4-dimethyl thiazolehydroxyethobromide (59.5g.) and N-[p-bis (hydroxyethyl)aminobenzylidine] p-[bis(hydroxyethyl)amino]aniline (97g.) are combined in 180 ml. abs. ethanol. 23.3g. of piperidine are added and the reaction mixture is refluxed for 15 minutes. The resulting product is cooled and diluted with 300 ml. of acetone. After 1 hour of cooling in the freezer, the material is filtered, washed with alcohol and acetone and dried. After one recrystallization from methanol, 54g. of dye are obtained. Recrystallization from ethanol gives a product which melts at 227°–228°C, Dmax. 0.86 at 482 ml. (1/110,000 methanol); yield 50.5% (based on quaternary salt).

Aldehyde Method:

2,4-Dimethylthiazole hydroxyethobromide (4.8g.) and p-bis (β-hydroxyethyl) aminobenzaldehyde (4.2g.) in 10 ml. ethanol containing 1.5g. piperidine are refluxed for 15 minutes. After cooling, the addition of acetone gave a light purple material (2.2g.), Dmax. 0.69; after recrystallization from ethanol, Dmax. 0.82, 482 millimicrons, 1/110,000 methanol, m. 227°–228°C., yield=1.2g.(13.9% based on the weight of the quaternary salt).

EXAMPLE 5

6-Dimethylaminoquinaldine-β-hydroxyethobromide (6.2g.) and p-bis (β-hydroxyethyl) aminobenzaldehyde (4.2g.) in 15 ml. of ethanol containing 1.5g piperidine is refluxed for 5 minutes and 20 ml. of ethanol then added. The mixture is cooled and the greenish-purple precipitate is separated. Acetone is added to the filtrate to obtain additional product for a total of 5.5g. of crude product which on recrystallization gives 2.5g., Dmax. 0.76. Concentration of the filtrate gives 0.6g.; Dmax. 0.93. The combined products are chromatographed to obtain 0.9g. (Dmax. 0.97) of the desired product which on recrystallization from methanol showed Dmax. 1.0, 534 millimicrons, (1/110,000 methanol) m. 252°–253°C.

EXAMPLE 6

The Example 4 product is converted to the corresponding chloride by refluxing in a mixture of silver chloride (freshly prepared) in methanol for 4 hours. The mixture is filtered and the filtrate concentrated to precipitate the chloride salt, Dmax. 0.97, 480 millimicrons (1/110,000 methanol) m.231°–232°C. after recrystallization from ethanol.

EXAMPLE 7

The Example 5 product is converted to the corresponding chloride by the method of Example 6. The product is recrystallized from ethanol, m. 249°–250°C., Dmax. 1.08, 534 millimicrons (1/110,000 methanol).

PHOTOGRAPHIC SPEED DETERMINATION

A mixture of 4 parts by weight of titanium dioxide and 1 part by weight of an emulsion of "Rhoplex" acrylate resin containing about 50 per cent of solids in water is used to coat paper sheets.

A sheet of the coated paper is sensitized by dipping into a solution containing 20 milligrams of the selected dye (2-p-dimethylaminostyryl-4-methylthiazole metho chloride) in 200 ml. of methanol, and then dried.

The sensitized paper is exposed to imaging light from a Kodak 101 sensitometer which has a tungsten lamp producing an intensity of 1700 meter candles at the sensitometric wedge and a color temperature of 2650°K for 20 seconds.

The exposed prints are then dipped in a saturated solution of silver nitrate in methanol, and then in a solution comprising 5 gm. of phenidone, 40 gm. of citric acid monohydrate, and 1 liter of methanol. A visible negative image of the positive exposure image was obtained. The visible image bearing print is then immersed in a methanolic potassium thiocyanate (KSCN) stop bath, then fixed by immersing in an aqueous sodium thiosulfate solution, and finally washed in running water. The photographic speed was determined by the LES method. LES (abbreviation for light exposure speed) refers to a speed rating system developed at the Wright Air Development Division of the Air Research and Development Command (U.S.A.F.), and is defined as the reciprocal of the exposure in meter candle seconds which is required to produce a double diffuse reflection density of 0.2 density units above the sum of the base plus fog densities. As in the more conventional ASA system used to rate silver halide films, the higher the LES number the faster the photographic exposure speed of the film is.

Exposures are made on an Eastman 101 sensitometer with the light converted by the use of a 78AA Eastman Wratten Filter to equal mean noonday light (5500°K). In addition, the step tablet in the sensitometer is partly covered with strips of Eastman filters No. 58 (green transmitting) and No. 29 (red transmitting) so that a single exposure gives a measure of the response of the film to white, green and red light.

The results with new compounds of this invention are as follows:

| Compound of Example | 78AA Filter (LES X10$^{-2}$) | 78AA+58 | 78AA+29 |
|---|---|---|---|
| 7 | 4.75 | 5.05 | 7.19 |
| 5 | 4.64 | 4.00 | 6.57 |
| 6 | 4.54 | 4.59 | — |
| 4 | 4.23 | 3.11 | — |
| Comparison Compound | 2.27 | 1.42 | — |

Comparison compound is 2-p-dimethylaminostyryl-4-methylthiazole methochloride.

What is claimed is:

1. An image reproduction medium comprising (1) a photoconductor comprising a radiation activatable photosensitive titanium dioxide and (2) a sensitizing dye compound of the formula:

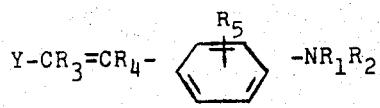

wherein Y is a radical of a heterocyclic aromatic compound containing at least one quaternary nitrogen hetero atom; and wherein Y is selected from the group consisting of:

FORMULA I

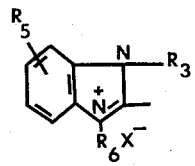

FORMULA II

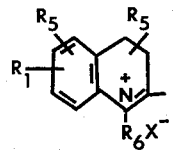

FORMULA III

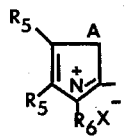

FORMULA IV

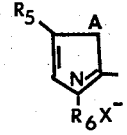

FORMULA V

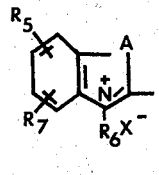

wherein A is oxygen, sulfur or selenium; $R_7$ is alkoxy or amino; $R_6$ is selected from the group consisting of hydrogen, alkyl, aralkyl and hydroxyalkyl; and X is a negative radical; $R_1$ and $R_2$ are each hydroxyalkyl; $R_3$ and $R_4$ are each selected from the group consisting of hydrogen and alkyl; and $R_5$ is selected from the group consisting of hydrogen, alkyl, aryl, aralkyl, alkoxy, and $NR_1R_2$ wherein $R_1$ and $R_2$ are each as described herein.

2. An image reproducing medium comprising (1) a photoconductor comprising a radiation activable titanium dioxide having a particle size less than about 250 millimicrons and (2) a sensitizing dye composition of the formula

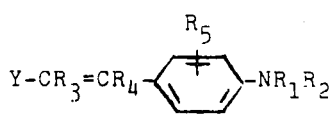

wherein Y is a radical of a heterocyclic aromatic compound containing at least one quaternary nitrogen hetero atom; $R_1$ is hydroxyalkyl; $R_2$ is selected from the group consisting of hydrogen, alkyl, aryl, alkaryl, aralkyl and hydroxyalkyl; $R_3$ and $R_4$ are each selected from the group consisting of hydrogen and alkyl; and $R_5$ is selected from the group consisting of hydrogen, alkyl, aryl, aralkyl, alkaryl, alkoxy, and $NR_1R_2$ wherein $R_1$ and $R_2$ are each as described herein.

3. A compound as in claim 2, wherein Y is selected from the group consisting of compounds of the formulae:

FORMULA I

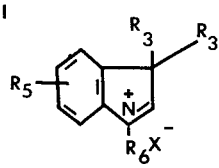

FORMULA II

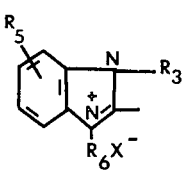

FORMULA III

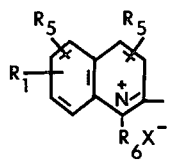

FORMULA IV

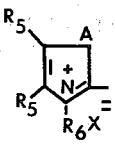

FORMULA V

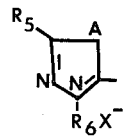

FORMULA VI

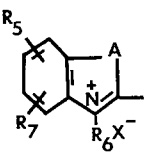

wherein A is oxygen, sulfur or selenium; $R_7$ is alkoxy or amino; $R_6$ is selected from the group consisting of hydrogen, alkyl, aralkyl and hydroxyalkyl; and X is a negative radical.

4. A medium as in claim 2 wherein $R_1$ and $R_2$ each are hydroxyalkyl.

5. An image reproducing medium comprising (1) a photoconductor comprising a radiation activable titanium dioxide having a particle size less than about 250 millimicrons and (2) a sensitizing dye comprising 2-[p-Di(hydroxyethyl)aminostyryl]-5-methyl-3-hydroxyethylthiadiazolium chloride.

6. An image reproducing medium comprising (1) a photoconductor comprising a radiation activable titanium dioxide having a particle size less than about 250 millimicrons and (2) a sensitizing dye comprising 2-[p-Di(hydroxyethyl)aminostyryl]-3,5-dimethylthiadiazolium nitrate.

7. An image reproducing medium comprising (1) a photoconductor comprising a radiation activable titanium dioxide having a particle size less than about 250 millimicrons and (2) a sensitizing dye is N-Hydroxyethyl-2-[p-di(hydroxyethyl)aminostyryl]-6-dimethylaminoquinolium bromide or chloride.

8. An image reproducing medium comprising (1) a photoconductor comprising a radiation activable titanium dioxide having a particle size less than about 250 millimicrons and (2) a sensitizing dye is N-Hydroxyethyl-4-methyl-2-[p-di(hydroxyethyl)-aminostyryl] thiazolium bromide or chloride.

9. In a process for recording an image pattern of activating radiation in the absence of an externally applied electric field, comprising exposing a copy medium comprising a photoconductor comprising photosensitive titanium dioxide to an image pattern of activating radiation and contacting with a physical developer comprising a solution of metal ions, the improvement comprising incorporating in said copy medium at the time of or prior to the exposing step, a sensitizing dye selected from the group consisting of 2-[p-Di(hydroxyethyl)aminostyryl]-5-methyl-3-hydroxyethylthiadiazolium chloride, 2-[p-Di(hydroxyethyl) aminostyryl]-3,5-dimethylthiadiazolium nitrate, and N-Hydroxyethyl-4-methyl-2-[p-di(hydroxyethyl)-aminostyryl] thiazolium bromide or chloride.

* * * * *